(12) United States Patent
Katta (10) Patent No.: US 12,541,132 B2
(45) Date of Patent: *Feb. 3, 2026

(54) TRANSFLECTIVE SPATIAL LIGHT MODULATOR WITH ENHANCED DIFFUSION OF LIGHT AND METHOD OF MANUFACTURE OF THE SAME

(71) Applicant: Daylight Computer Co., Fremont, CA (US)

(72) Inventor: Anjan Katta, San Francisco, CA (US)

(73) Assignee: Daylight Computer Co., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,036

(22) Filed: Jun. 13, 2024

(65) Prior Publication Data

US 2025/0208472 A1     Jun. 26, 2025

Related U.S. Application Data

(63) Continuation of application No. 18/396,079, filed on Dec. 26, 2023, now Pat. No. 12,061,401.

(51) Int. Cl.
*G02F 1/1368* (2006.01)
*G02F 1/1335* (2006.01)

(52) U.S. Cl.
CPC ...... *G02F 1/1368* (2013.01); *G02F 1/133504* (2013.01); *G02F 1/133528* (2013.01)

(58) Field of Classification Search
CPC ........... G03H 2225/22; G03H 2225/60; G03H 2225/52; G03H 1/2294; G03H 2001/0224;

(Continued)

(56) References Cited

U.S. PATENT DOCUMENTS

2001/0052961 A1* 12/2001 Towler .................. G02F 1/1395
349/177
2006/0097978 A1     5/2006 Ng
(Continued)

FOREIGN PATENT DOCUMENTS

CN         205787482 U     12/2016
JP         H10253959        9/1998
(Continued)

*Primary Examiner* — Mariam Qureshi
(74) *Attorney, Agent, or Firm* — Esplin & Associates, PC (57) ABSTRACT

Some implementations relate to a transflective spatial light modulator for enhancing the visual characteristics of a display device, making them paper-like, high resolution, and high brightness. The modulator may include a front surface configured to receive and modulate light from a primary source into visual information for display. The modulator may include a rear surface opposite the front surface and a stack of layers between the two surfaces. The stack of layers may include a polarizing layer, an anisotropic diffuser film, a liquid crystal layer, a thin film transistor element, and a layer of micro-reflective structure electrodes. The thin film transistor element may apply electricity to the liquid crystal layer to effectuate addressable spatial light modulation, solving intrinsic problems of transflective spatial light modulators. The combination of these elements results in a transflective spatial light modulator that is paper-like, high resolution, and high brightness.

20 Claims, 3 Drawing Sheets

(58) Field of Classification Search
CPC ............ G02F 2203/12; G02B 27/0101; G02B 27/017; G02B 2027/0118; G02B 2027/012; G02B 2027/0121; G02B 2027/015; G02B 27/283; G02B 2027/0112; B60R 2300/205; G03B 21/604
See application file for complete search history.

(56) References Cited

U.S. PATENT DOCUMENTS

| | | | |
|---|---|---|---|
| 2006/0146236 A1* | 7/2006 | Wu | G02F 1/133555 349/114 |
| 2014/0055037 A1 | 2/2014 | Kurita | |
| 2015/0131141 A1 | 5/2015 | Nakahara | |
| 2020/0096825 A1* | 3/2020 | Itoh | G02F 1/13439 |
| 2024/0126117 A1* | 4/2024 | Watanabe | G02F 1/133374 |
| 2025/0271702 A1 | 8/2025 | Anjan | |
| 2025/0271704 A1 | 8/2025 | Anjan | |

FOREIGN PATENT DOCUMENTS

| | | |
|---|---|---|
| JP | 2002131743 A | 5/2002 |
| JP | 2014203004 | 10/2014 |
| JP | 2016212290 A | 12/2016 |
| JP | 2017097053 | 6/2017 |
| JP | 2021096461 | 6/2021 |
| KR | 1020120043004 A | 5/2012 |
| KR | 1020180012115 A | 2/2018 |

* cited by examiner

TRANSFLECTIVE SPATIAL LIGHT MODULATOR WITH ENHANCED DIFFUSION OF LIGHT AND METHOD OF MANUFACTURE OF THE SAME

FIELD OF THE DISCLOSURE

The present disclosure generally relates to display technologies, and more particularly to the design and manufacture of transflective spatial light modulators for enhanced diffusion of light in display devices.

BACKGROUND

Reflective displays are a type of display technology that utilizes ambient light to illuminate the display, reducing power consumption and improving visibility in bright environments. However, traditional reflective displays have faced challenges in achieving paper-like quality, high resolution, and high brightness. The reflective nature of these displays often results in a metallic appearance, which is not ideal for applications that require a paper-like display, such as electronic reading devices. Furthermore, achieving high resolution and brightness has been a challenge due to the inherent limitations of the reflective display technology.

SUMMARY

The subject disclosure provides for a combination of layers of Micro-reflective Structure ("MRS") electrodes and diffusion films within a transflective spatial light modulator for enhanced display brightness and diffusion of light. The inherent issues of reflective displays may limit their commercial viability and application. The metallic appearance of these displays may not be conducive to a paper-like reading experience, which may be a key requirement for devices such as electronic reading devices. Furthermore, achieving high resolution and brightness in reflective displays may be a significant challenge. These limitations may hinder the widespread adoption of reflective displays in commercial products, despite their potential advantages in terms of power consumption and visibility in bright environments.

Implementations described herein address the aforementioned shortcomings and other shortcomings by providing integration and commercialization of several material science advancements to enhance the characteristics of Reflective Liquid Crystal Displays (RLCDs). Some implementations may involve the combination of MRSs and diffusion films to create a paper-like, high-resolution, and/or high-brightness display. For example, the combination of MRSs and diffusion films in a display may result in a synergistic effect improving paper-like appearance of the display, facilitate viewing of the display from an improved viewing angle, and/or have other impacts. The display may appear brighter at an increased portion of off axis viewing angles and/or wider viewing angles. By way of non-limiting example, viewing angle of a display may be defined by a maximum angle relative to the display at which a user of the display may view the display with acceptable quality. The display may be enabled to capture, reflect, and/or be illuminated by light from a wider range of angles relative to the display. The combination of these components diffusing light at different points in the transflective spatial light modulator may provide a synergistic effect, resulting in a display that outperforms each component on its own.

Some implementations may include a method for quantifying the improvement in display quality through video analysis of brightness values and/or other methods. By way of non-limiting example, the improvement may be quantified using a goniometer and integrating sphere to measure brightness distribution at different illumination source angles. This innovative approach to improving reflective LCDs may have the potential to overcome the existing limitations and make these displays commercially viable.

One aspect of the present disclosure relates to a transflective spatial light modulator. The transflective spatial light modulator may include a front surface, a rear surface, a stack of layers, and/or other components. The front surface may be configured to receive light from a primary light source for modulation, and through which light that has been reflected and modulated into visual information for display passes on its way to a display surface. The primary light source may be ambient light and/or another source. The rear surface may be opposite the front surface. The stack of layers may be between the front surface and the rear surface. The stack of layers may include a polarizing layer. The stack of layers may include an anisotropic diffuser film disposed between the polarizing layer and the rear surface. The stack of layers may include a liquid crystal layer disposed between the anisotropic diffuser film and the rear surface. The stack of layers may include a thin film transistor element disposed between the liquid crystal layer and the rear surface. The thin film transistor element may be configured to apply electricity to the liquid crystal layer to effectuate addressable spatial light modulation by the liquid crystal layer. The stack of layers may include a layer of micro-reflective structure electrodes disposed between the thin film transistor element and the rear surface. In some implementations, the micro-reflective structure electrodes may be etched onto the rear surface. In some implementations, the rear surface may be a final and/or bottom layer of the RLCD.

According to some implementations, the thin film transistor element may be adjacent to the liquid crystal layer.

According to some implementations, the layer of micro-reflective structure electrodes may be adjacent to the thin film transistor element.

According to some implementations, the micro-reflective structure electrodes may have random and/or quasi-random shapes. For example, the random shapes may be generated, determined, and/or selected using a source of entropy. For example, the quasi-random shapes may be produced using a non-random algorithm (e.g., using a seed and/or another method). In some implementations, the determination of quasi-random shapes may appear to be random.

According to some implementations, the micro-reflective structure electrodes may have sizes between about 5 micrometers and about 7 micrometers, between about 4 micrometers and about 10 micrometers, and/or within other ranges less than about 50 micrometers.

In some implementations, the rear surface may include a polarizer. According to some implementations, the stack of layers further may include a diffuse, optically clear adhesive layer between the anisotropic diffuser film and the polarizer. According to some implementations, the polarizer may be an achromatic polarizer.

According to some implementations, the stack of layers may include an anti-glare, matte surface film that forms the front surface.

Another aspect of the present disclosure relates to a display device. The display device may include a display surface, a transflective spatial light modulator, and/or other components. The transflective spatial light modulator may include a front surface, a rear surface, a stack of layers, and/or other components. The front surface may be configured to receive light from a primary light source for modulation, and through which light that has been reflected and modulated into visual information for display passes on its way to a display surface. The primary light source may be ambient light. The rear surface may be opposite the front surface. The stack of layers may be between the front surface and the rear surface. The stack of layers may include a polarizing layer. The stack of layers may include an anisotropic diffuser film disposed between the polarizing layer and the rear surface. The stack of layers may include a liquid crystal layer disposed between the anisotropic diffuser film and the rear surface. The stack of layers may include a thin film transistor element disposed between the liquid crystal layer and the rear surface. The thin film transistor element may be configured to apply electricity to the liquid crystal layer to effectuate addressable spatial light modulation by the liquid crystal layer. The stack of layers may include a layer of micro-reflective structure electrodes disposed between the thin film transistor element and the rear surface. The transflective spatial light modulator may be disposed in the display device to receive light from the light source, modulate such light to produce visual information, and reflect the visual information toward the display surface for display.

Yet another aspect of the present disclosure relates to a method for manufacturing a transflective spatial light modulator. The method may include preparing a front surface configured to receive light from a primary light source for modulation, and through which light that has been reflected and modulated into visual information for display passes on its way to a display surface. The primary light source may be ambient light. The method may include preparing a rear surface opposite the front surface. The method may include assembling a stack of layers between the front surface and the rear surface. Assembling of the stack of layers may include placing an polarizing layer, disposing an anisotropic diffuser film between the polarizing layer and the rear surface, disposing a liquid crystal layer between the anisotropic diffuser film and the rear surface, disposing a thin film transistor element between the liquid crystal layer and the rear surface, and disposing a layer of micro-reflective structure electrodes between the thin film transistor element and the rear surface. The thin film transistor element may be configured to apply electricity to the liquid crystal layer to effectuate addressable spatial light modulation by the liquid crystal layer. The method may include sealing the assembled stack of layers between the front surface and the rear surface.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some implementations may address certain inherent issues with reflective liquid crystal displays (LCDs), transforming them into high-resolution, high-brightness, and paper-like displays. The inherent issues with reflective LCDs may include problems such as parallax, insufficient brightness, and low resolution. By addressing these issues, the LCDs may be transformed into high-resolution and high-brightness displays. The goal is to make reflective LCDs mimic the appearance of paper, which could make them more appealing, more user-friendly, and/or more comfortable to read. This may involve making the LCDs white enough and paper-like enough to be more appealing to the eye. By mimicking the appearance of paper, the LCDs may become more user-friendly and comfortable to read.

Some implementations may have significant value due to their unique characteristics, which differentiate it from other reflective display technologies. For example, E-ink, another reflective display technology, is known to have a slow refresh rate. E-ink, for instance, may be slower in refreshing the display compared to some implementations' reflective LCDs. In contrast, some implementations' reflective LCDs may offer a faster refresh rate and may be a more efficient alternative. The unique characteristics of some implementations may include its high resolution and brightness, which may set it apart from other reflective display technologies. Some implementations may involve making specific modifications to the reflective LCDs to address their inherent issues. These modifications may be made one at a time, with each one contributing to the overall improvement of the LCDs. The specific modifications may include changes to the LCD's structure or composition to improve its brightness and resolution. This approach may ensure that each issue is thoroughly addressed, contributing to the overall improvement of the LCDs. In some implementations, an OLED display may be used instead of an LCD. OLEDs are known for their high contrast ratios and wide viewing angles, which may potentially enhance brightness in a display system.

Different backlighting techniques may be used to enhance brightness of display systems in some implementations. For instance, full-array local dimming (FALD) may be used to control the backlighting in different zones of the display, enhancing the contrast and brightness. In some implementations, High Dynamic Range (HDR) technology may be used to enhance the brightness and contrast of the display system. HDR may provide a higher level of contrast between light and dark images on the screen, resulting in a more realistic image. In other implementations, different types of diffusion films may be used in combination with the display to enhance the brightness. For example, a micro-lens array film may be used to direct more light towards the viewer, enhancing perceived brightness. Lastly, software solutions may be used to enhance the brightness in some implementations. For instance, image processing algorithms may be used to adjust the brightness and contrast of the display in real-time.

Some implementations may involve the combination of various components to achieve the desired effect. For example, the combination of MRSs and diffusion films may be a key aspect of some implementations. This combination may result in a synergistic effect, making the transflective spatial light modulator perform better than it would if it only included one of these components. The improvement may be greater than the sum of each of these components when deployed individually and/or in other combinations of the components. The various components may include different materials or technologies that, when combined, enhance the performance of the spatial light modulator. This means that the combined effect of these components may be greater than the sum of their individual effects, leading to improved performance of the spatial light modulator.

Some implementations may also involve quantifying the improvements made to the transflective spatial light modulator. This could be done through video analysis, using a goniometer and an integrating sphere, and/or through other methods. By way of non-limiting example, video analysis may be conducted to compare the brightness values of the transflective spatial light modulator before and after the modifications. This comparison may provide a clear indication of the improvements made to the transflective spatial light modulator. Video analysis may be used as a tool for this measurement, providing a visual comparison of the transflective spatial light modulator before and after the modifications. By comparing the brightness values before and after the modifications, the project team may be able to clearly see the improvements made. The process of quantifying the improvements may involve measuring certain parameters of the transflective spatial light modulator, such as their brightness or resolution. By way of non-limiting example, the goniometer and the integrating sphere may be used to measure distribution at different illumination source angles.

Figure 1:
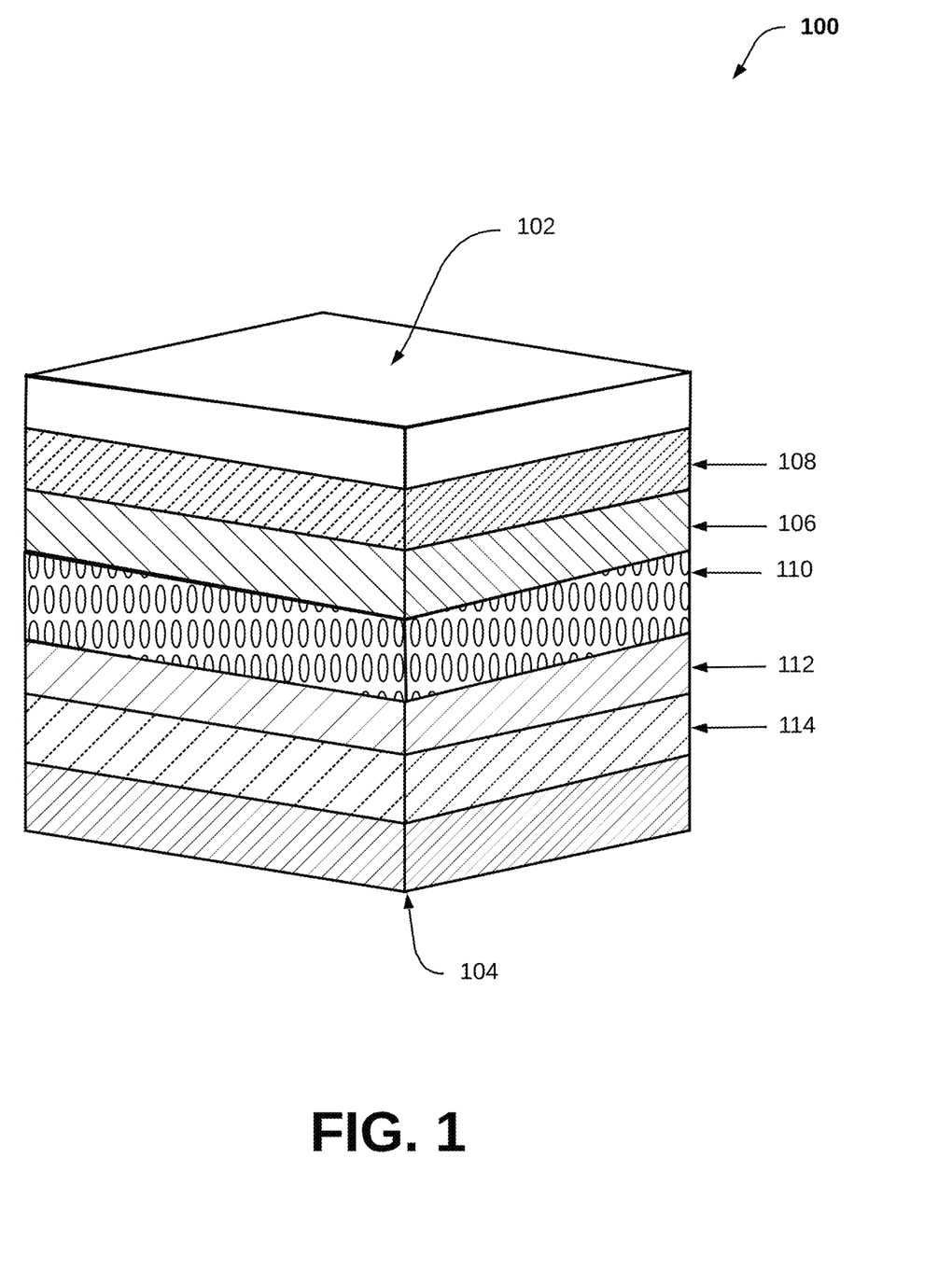
FIG. 1 illustrates an exemplary stack of layers that form a transflective spatial light modulator, in accordance with some implementations.

FIG. 1 illustrates an exemplary stack of layers 100 that form a transflective spatial light modulator, in accordance with some implementations. The term "transflective" may refer to the ability of the modulator to both transmit and reflect light, a feature that enhances the brightness and viewing angle of a display. As shown in FIG. 1, the stack of layers 100 may include one or more of a front surface 102, a rear surface 104, an anisotropic diffuser film 106, a polarizing layer 108, a liquid crystal layer 110, a thin film transistor element 112, and a layer of micro-reflective structure electrodes 114, and/or other components. The specific arrangement of these layers may be designed to optimize the modulation of light and the quality of the resulting display.

The front surface 102 may be configured to receive light from a primary light source for modulation. This primary light source may be ambient light or some other source of light directed onto the front surface 102. The light from this source may be directed towards the front surface 102, where it begins its journey through the stack of layers. This light, after being reflected and modulated into visual information for display, may pass through the front surface 102 on its way to a display surface. The display surface may be any surface suitable for displaying visual information, such as a screen or a projection surface. The modulated light may carry the visual information to this display surface, creating the final image.

Opposite the front surface 102 is the rear surface 104. The rear surface 104 may be made of a durable material to provide structural stability to the stack. The rear surface 104 serves as the base upon which the other layers are stacked. This arrangement may ensure that the layers are properly aligned and secured. Proper alignment of the layers may result in the modulator functioning correctly, as misalignment could result in distortion or loss of the visual information.

The polarizing layer 108 may be disposed between the front surface 102 and the rear surface 104. The positioning of the polarizing layer 108 immediately after the front surface 102 may ensure that the diffused light is immediately polarized, optimizing the modulation process. The polarizing layer 108 may serve to polarize the light passing through it, ensuring that only light with the correct polarization can pass through to the next layer. This selective passage of light based on polarization may enable the modulator to create detailed and high-quality visual information.

The anisotropic diffuser film 106 may be positioned between the polarizing layer 108 and the rear surface 104. The term "anisotropic" may refer to a property of being directionally dependent, meaning that the anisotropic diffuser film 106 may scatter light in a specific direction. This controlled scattering of light may enhance the brightness and the viewing angle of the display. The direction in which the light is scattered may be controlled by adjusting properties of the anisotropic diffuser film 106. This controlled diffusion of light may ensure that the visual information is displayed with high clarity and brightness, regardless of the viewing angle. By way of non-limiting example, the anisotropic diffuser film 106 may be adhered to the bottom of the polarizing layer 108. By way of non-limiting example, the anisotropic diffuser film 106 may be protected by the polarizing layer 108.

The liquid crystal layer 110 may be disposed between the anisotropic diffuser film 106 and the rear surface 104. The liquid crystal layer 110 may be where the actual modulation of light takes place. The liquid crystals in this layer may be manipulated by applying an electric field, changing the polarization of the light passing through them. In some implementations, the liquid crystal layer 110 may include color filter glass, a polarizer, a polarizing film, liquid crystal, and/or other components. In some implementations, the color filter glass may be thinned such that distance from the anisotropic diffuser film to the layer of micro-reflective structure electrodes 114 and/or rear surface 104 is minimized. By way of non-limiting example, the polarizing layer may include an Advanced Polarization Conversion Film (APCF). By way of non-limiting example, reducing the distance from the anisotropic diffuser film to the layer of micro-reflective structure electrodes 114 and/or rear surface 104 may reduce blur.

The thin film transistor element 112, which may be disposed between the liquid crystal layer 110 and the rear surface 104, may apply electricity to the liquid crystal layer 110 to effectuate addressable spatial light modulation by the liquid crystal layer 110. The thin film transistor element 112 may control the application of electricity to the liquid crystal layer 110. By controlling the electric field, the thin film transistor element 112 may control the modulation of light by the liquid crystal layer 110, creating the desired visual information.

The layer of micro-reflective structure electrodes 114 may be disposed between the thin film transistor element 112 and the rear surface 104. The layer of micro-reflective structure electrodes 114 may be composed of tiny, reflective electrodes that reflect the modulated light back towards the front surface 102. This reflection may enhance the brightness and the viewing angle of the display, as it may ensure that the modulated light is directed towards the display surface, creating the final image. The layer of micro-reflective structure electrodes 114 may diffuse light reaching itself. The combination of the anisotropic diffuser film 106 and the layer of micro-reflective structure electrodes 114 may create a synergistic effect, resulting in a high-quality, bright, and wide-viewing-angle display.

Figure 2:
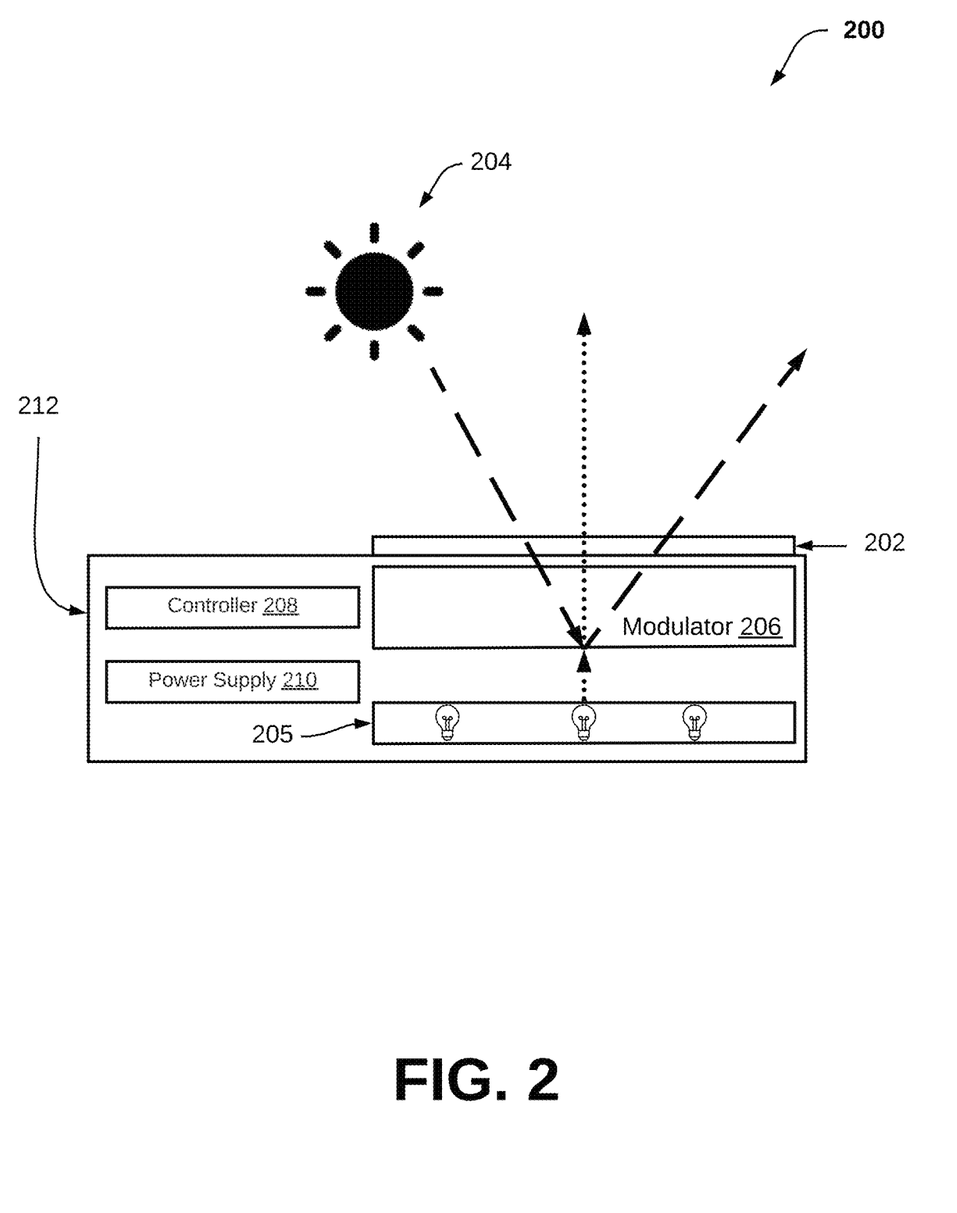
FIG. 2 illustrates an exemplary display device that implements a transflective spatial light modulator, in accordance with some implementations.

FIG. 2 illustrates an exemplary display device 200 that implements a transflective spatial light modulator, in accordance with some implementations. As shown in FIG. 2, the display device 200 may include one or more of a screen 202, a light source 204, a modulator 206, a controller 208, a power supply 210, a casing 212, and/or other components. The display device 200 may be a device such as a television, a computer monitor, a smartphone, or a tablet. The display device 200 may be used in various settings, such as in a home, an office, a school, or a public place.

The screen 202 of the display device 200 may be a flat panel display, such as a liquid crystal display (LCD), an organic light-emitting diode (OLED) display, or any other type of display that can display images. The screen 202 may be a component that visually presents information to a user. The screen 202 may be capable of displaying images in color or in black and white. The screen 202 may be capable of displaying images at various resolutions. The screen 202 may be capable of displaying images with a high level of detail, such as high-definition or ultra-high-definition images. The screen 202 may be touch-sensitive, allowing a user to interact with the display device 200 by touching the screen 202. The screen 202 may be capable of detecting a user's touch and translating it into a command or an input for the display device 200.

The light source 204 of the display device 200 may be any type of light source capable of illuminating the screen 202. The light source 204 may be ambient light, and/or any other component that provides light for the screen 202. In some implementations, display device 200 may include a backlighting source 205. The backlighting source 205 may be a backlight for modulator 206. The backlighting source 205 may be located behind the screen 202.

The modulator 206 of the display device 200 may be a spatial light modulator that modulates the light from the light source 204 to form an image on the screen 202. The modulator 206 may be a component that controls the light from the light source 204 to create an image. The modulator 206 may include the stack of layers 100 that form a transflective spatial light modulator, as described in FIG. 1. The modulator 206 may be addressable to selectively reflect light from light source 204 back toward screen 202 across an array of separate locations.

The controller 208 of the display device 200 may be a microcontroller, a microprocessor, or any other type of controller capable of controlling the operation of the display device 200. The controller 208 may be a component that manages the operation of the display device 200. The controller 208 may be capable of controlling the light source 204, the modulator 206, and other components of the display device 200. The controller 208 may be capable of sending commands to the backlighting source 205, the modulator 206. and/or other components to control the display of images on the screen 202. The controller 208 may be capable of receiving input from a user, from a computer, or from other devices, and may be capable of outputting signals to control the operation of the display device 200. The controller 208 may be capable of processing input from a user or a computer and translating it into commands for the display device 200.

The power supply 210 of the display device 200 may be a battery, a power adapter, or any other type of power supply capable of supplying power to the display device 200. The power supply 210 may be a component that provides electrical power to the display device 200. The power supply 210 may be capable of supplying power at various voltages and currents. The power supply 210 may be capable of supplying power continuously and/or intermittently. The power supply 210 may be capable of providing a steady supply of power to the display device 200, or it may be capable of providing power in bursts or pulses.

The casing 212 of the display device 200 may be a housing that encloses the other components of the display device 200. The casing 212 may be a component that protects the other components of the display device 200 from damage. The casing 212 may be made of plastic, metal, or any other material capable of protecting the components of the display device 200. The casing 212 may be a sturdy and durable component that can withstand impacts and other forms of physical stress. The casing 212 may be designed to allow access to the screen 202, and may include openings for connectors, switches, and other components of the display device 200. The casing 212 may be designed to allow easy access to the screen 202 for viewing and interaction, while also providing openings for the connection of cables, the operation of switches, and the use of other components.

Figure 3:
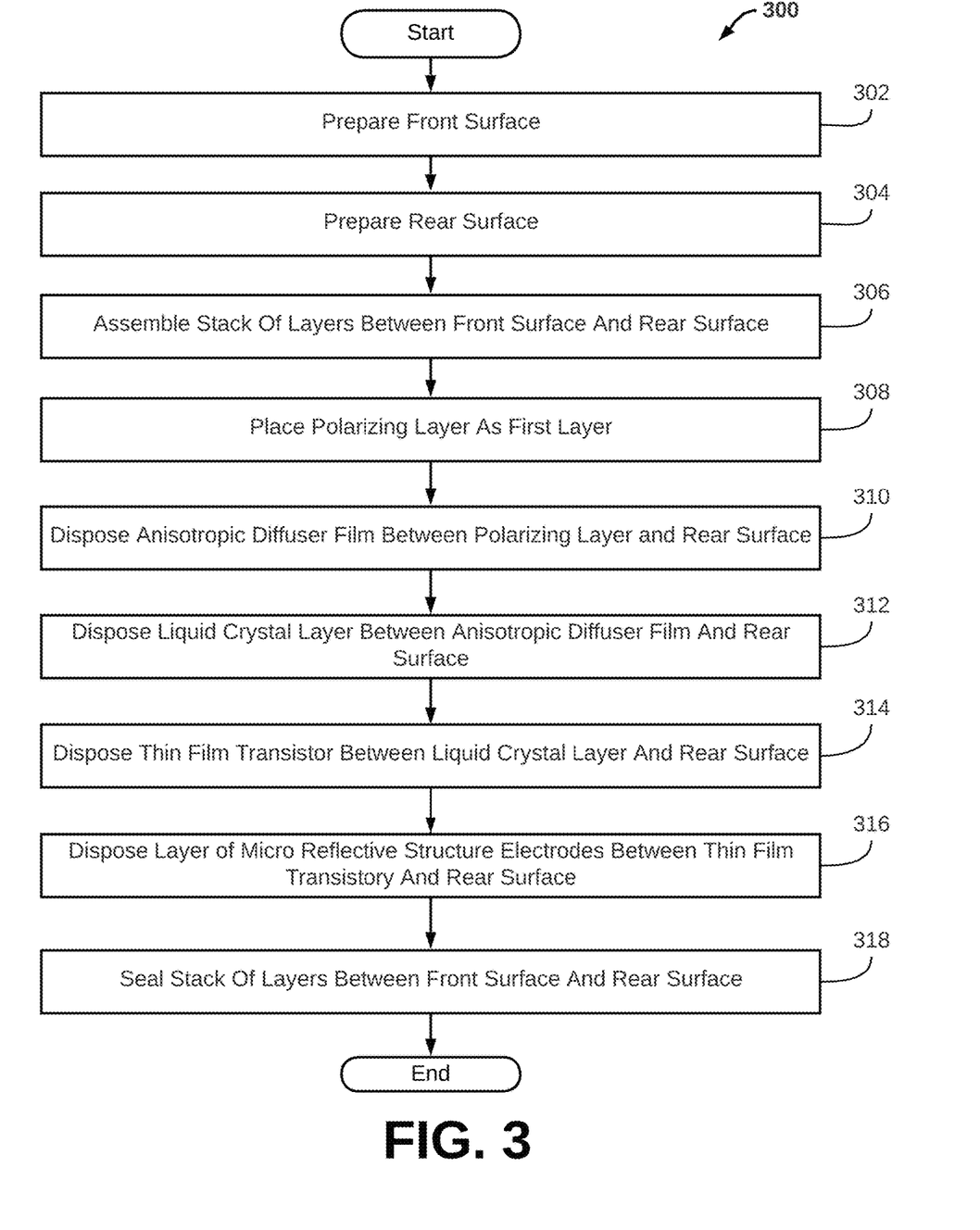
FIG. 3 illustrates a method of manufacture of a transflective spatial light modulator, in accordance with some implementations.

FIG. 3 illustrates a method 300 for manufacturing of a transflective spatial light modulator, in accordance with some implementations. This transflective spatial light modulator may include the stack of layers 100 described in connection with FIG. 1. For explanatory purposes, the steps of the example method 300 are described herein as occurring in serial, or linearly. However, multiple instances of the example method 300 may occur in parallel.

At step 302, a front surface may be prepared. This front surface may be the initial point of contact for the light from a primary light source. In some implementations, preparing the front surface may include thinning a piece of glass. In some implementations, preparing the front surface may include applying an anti-glare film on the piece of glass using an adhesive. The preparation of the front surface may involve a cleaning and smoothing processes to ensure optimal light transmission. The primary light source may be any source of light, such as an LED or a laser.

At step 304, a rear surface may be prepared. This rear surface may be the final point of contact for the modulated light before it is reflected back towards the front surface. The preparation of the rear surface may involve similar processes to those used in the preparation of the front surface. In some implementations, preparing the rear surface may include vapor deposition of metal onto a thin-film transistor (TFT). This rear surface may be positioned opposite the front surface. The positioning of the rear surface opposite the front surface may allow for the efficient reflection and modulation of light.

At step 306, a stack of layers may be assembled between the front surface and the rear surface. The assembly of the stack of layers may involve placing each layer in a specific order. The specific order of the layers may be determined by the desired properties of the modulated light. This stack of layers may include a polarizing layer, an anisotropic diffuser film, a liquid crystal layer, a thin film transistor element, and a layer of micro-reflective structure electrodes. Each of these layers may contribute to the modulation of light.

At step 308, the polarizing layer may be placed as the first layer in the stack. The polarizing layer may be responsible for polarizing the light. Polarization of light may involve aligning the light waves in a specific direction. This layer may be responsible for polarizing the light that passes through it. The polarized light may then pass through the subsequent layers in the stack. This polarizing layer may be positioned closest to the front surface. The positioning of the polarizing layer closest to the front surface may allow it to interact with the light from the primary light source before any other layer.

At step 310, the anisotropic diffuser film may be disposed between the polarizing layer and the rear surface. The anisotropic diffuser film may be responsible for diffusing the light from the primary light source. The diffusion of light may involve spreading the light out over a larger area.

At step 312, the liquid crystal layer may be disposed between the anisotropic diffuser film and the rear surface. The liquid crystal layer may be responsible for modulating the polarized light. Modulation of the polarized light may involve changing its properties, such as its intensity or direction. This layer may be responsible for modulating the polarized light.

At step 314, the thin film transistor element may be disposed between the liquid crystal layer and the rear surface. The thin film transistor element may be responsible for applying electricity to the liquid crystal layer. The application of electricity to the liquid crystal layer may cause it to change its properties, thereby modulating the light. This element may be configured to apply electricity to the liquid crystal layer to effectuate addressable spatial light modulation by the liquid crystal layer.

At step 316, a layer of micro-reflective structure electrodes may be disposed between the thin film transistor element and the rear surface. The layer of micro-reflective structure electrodes may be responsible for reflecting the modulated light back towards the front surface. The reflection of the modulated light may involve changing its direction so that it travels back towards the front surface. In some implementations, step 316 may include etching the micro-reflective structure electrodes onto the rear surface.

At step 318, the assembled stack of layers may be sealed between the front surface and the rear surface to complete the manufacture of the transflective spatial light modulator 300. The sealing of the stack of layers may involve enclosing the layers to protect them from external factors. The completion of the manufacture of the transflective spatial light modulator may involve final checks and quality control processes.

These implementations may also be applied to other problems where enhancing brightness is desirable, such as in automotive displays, outdoor signage, or any other display systems where visibility might be compromised due to external lighting conditions.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A transflective spatial light modulator, the transflective spatial light modulator comprising:
    a front surface configured to receive light from a primary light source for modulation, and through which light that has been reflected and modulated into visual information for display passes on its way to a display surface;
    a rear surface opposite the front surface; and
    a stack of layers between the front surface and the rear surface, wherein the stack of layers includes:
        a liquid crystal layer;
        a thin film transistor element disposed between the liquid crystal layer and the rear surface, wherein the thin film transistor element is configured to apply electricity to the liquid crystal layer to effectuate addressable spatial light modulation by the liquid crystal layer; and
        a layer of micro-reflective structure (MRS) electrodes disposed between the thin film transistor element and the rear surface, wherein the layer of MRS electrodes is adjacent to the thin film transistor element.

2. The transflective spatial light modulator of claim 1, wherein the stack of layers further includes a polarizing layer disposed between the front surface and the liquid crystal layer.

3. The transflective spatial light modulator of claim 2, wherein the polarizing layer is an achromatic polarizer.

4. The transflective spatial light modulator of claim 1, wherein the stack of layers further includes an anisotropic diffuser film disposed between the front surface and the liquid crystal layer.

5. The transflective spatial light modulator of claim 4, wherein the anisotropic diffuser film is capable of scattering light in a specific direction, wherein the scattering of light enhances a brightness and a viewing angle of displaying information on the display surface.

6. The transflective spatial light modulator of claim 1, wherein the layer of MRS electrodes is adjacent to the rear surface.

7. The transflective spatial light modulator of claim 1, wherein the MRS electrodes in the layer of MRS electrodes have random and/or quasi-random shapes.

8. The transflective spatial light modulator of claim 1, wherein the MRS electrodes in the layer of MRS electrodes have sizes between about 5 micrometers and about 7 micrometers.

9. The transflective spatial light modulator of claim 1, wherein the stack of layers includes an anti-glare matte surface film that forms the front surface.

10. The transflective spatial light modulator of claim 1, wherein the thin film transistor element is adjacent to the liquid crystal layer.

11. A method of manufacturing a transflective spatial light modulator, the method comprising:
    preparing a front surface configured to receive light from a primary light source for modulation, and through which light that has been reflected and modulated into visual information for display passes on its way to a display surface;
    preparing a rear surface opposite the front surface; and
    assembling a stack of layers between the front surface and the rear surface, wherein the stack of layers includes:
        placing a liquid crystal layer;
        disposing a thin film transistor element between the liquid crystal layer and the rear surface, wherein the thin film transistor element is configured to apply electricity to the liquid crystal layer to effectuate addressable spatial light modulation by the liquid crystal layer; and disposing a layer of micro-reflective structure (MRS) electrodes between the thin film transistor element and the rear surface.

12. The method of claim 11, wherein the method further includes:
   disposing a polarizing layer between the front surface and the liquid crystal layer.

13. The method of claim 12, wherein the polarizing layer is an achromatic polarizer.

14. The method of claim 11, wherein the method further includes:
   disposing an anisotropic diffuser film between the front surface and the liquid crystal layer.

15. The method of claim 14, wherein the anisotropic diffuser film is capable of scattering light in a specific direction, wherein the scattering of light enhances a brightness and a viewing angle of displaying information on the display surface.

16. The method of claim 11, wherein the layer of MRS electrodes is adjacent to the rear surface.

17. The method of claim 11, wherein the MRS electrodes in the layer of MRS electrodes have random and/or quasi-random shapes.

18. The method of claim 11, wherein the MRS electrodes in the layer of MRS electrodes have sizes between about 5 micrometers and about 7 micrometers.

19. The method of claim 11, wherein the stack of layers includes an anti-glare matte surface film that forms the front surface.

20. The method of claim 11, wherein the thin film transistor element is adjacent to the liquid crystal layer.

\* \* \* \* \*